Patented Mar. 8, 1932

1,848,158

UNITED STATES PATENT OFFICE

AMERIGO F. CAPRIO, OF NEWARK, NEW JERSEY, ASSIGNOR TO CELLULOID CORPORATION, A CORPORATION OF NEW JERSEY

DECORATED MATERIAL AND THE PROCESS OF MAKING SAME

No Drawing.      Application filed February 26, 1929. Serial No. 342,943.

This invention pertains to the general class of decorative materials and particularly to the class of materials intended to produce pearly, nacreous, or scintillating effects. More particularly this invention pertains to imparting a pearly, nacreous, or scintillating appearance to various compositions of which those having as an important or the principal ingredient some form of cellulose are examples. An outstanding composition is the product made with cellulose nitrate.

Heretofore pearly effects have been produced in such materials principally by disseminating throughout same a substance known as fish scale luster or essence. Its high cost and the precautions imposed by the fragile nature of the scale have necessitated the use of extreme care in the manipulation of fish scale in the rolls or other mixing apparatus. This has naturally raised production cost and limited the extent of use to materials intended generally for the manufacture of articles of relatively high intrinsic value. This inadaptability of fish scale essence to the usual mixing and preparing operations of plastic manufacture along with its high price has led the art to seek for less difficult and cheaper means of producing plastics having a natural pearl brilliancy, and especially for fish scale substitutes of low cost in themselves. The aim has also been to improve quality by some unusual luster-producing property in the fish-scale substitute.

In searching for the desired material, the deficiencies of many so-called fish scale substitutes have also been kept in view. Among these deficiencies are the following: chemical instability, resulting in corrosion of machinery and other injury; discoloration by heat and light and ordinary chemical reagents; loss of nacreous properties when reduced to dry form, thus necessitating dispersion in solution at all times; incompatibility with many of the usual solvents for pyroxylin, thus necessitating the use of special solvents; more or less poisonous character, particularly those of inorganic nature; and a disposition to settle rapidly in the solutions.

An object of my invention therefore, is to provide a novel decorated material and a process for making same.

A further object of my invention is to provide novel means for producing pearly, nacreous, lustrous and/or scintillating materials.

A further object of my invention is to provide a novel substitute for fish scale in the production of pearly, nacreous, lustrous or scintillating effects in various materials.

A further object of my invention is the production of a fish scale substitute that is of low cost; that is relatively light in weight; that is neutral and non-corrosive in nature; that exhibits great resistance to light and heat and chemical reagents such as ammonia, caustic soda, and the like; that maintains its nacreous properties when reduced to dry or powdered form; that is compatible with and inert in all of the usual solvents, particularly those employed in the manufacture of pyroxylin and acetyl cellulose products; that is relatively non-poisonous particularly when compared to materials of an inorganic nature; that may be chemically prepared in the laboratory; that is compatible with and will readily mix with fish scale essence or substitutes for fish scale essence; that will exercise a stabilizing power in and is compatible with cellulose esters and other materials; and that is otherwise highly satisfactory for its intended purpose.

Many other objects and advantages will become apparent to persons skilled in the art as the specification proceeds.

It will be noted that whereas the fish scale luster or essence is of organic character the substitutes heretofore as far as I am aware, have been composed of elements of inorganic nature. I introduce a distinctive novelty, in employing a substance more closely related to the real fish scale, said substance being of organic character, bland, neutral, permanent, non-corrosive and of a brilliancy of light refraction comparable to that which distinguishes fish scales. Similar to fish scales, it is practically insoluble in cellulosic solutions and thus has free play for its nacreous and other effects.

This substance which is introduced into various materials in place of fish scales is known chemically as oxanilid.

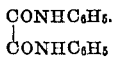

It is only sparingly soluble in the alcoholic or other liquid menstrua employed in the manufacture of cellulosic plastics and it is capable of thorough dispersion. Once dispersed its molecules or particles or ultimate forms show such a remarkable reflective or refractive action on light that the celluloidal solutions or other compositions gleam with positive pearly effect. As well as being of relatively low cost it is also compatible with all of the usual solvents. Another valuable feature associated with its use is its physical compatibility with solutions. Unlike other fish scale substitutes its particles do not subside rapidly in the solutions but tend to remain in their places where the mixing operations have left them.

My pearl material exhibits unusual resistance to discoloration by heat or light as well as by reagents, such as ammonia, caustic soda and the like. Unlike the usual inorganic substitutes, pearly scales of oxanilide do not lose their brilliance when reduced to dry form.

The cellulosic substances which may be used in accordance with this invention include the whole line of cellulose esters and ethers (pyroxylin, acetyl cellulose, ethyl cellulose and the like) the only requirement being that of solubility in the usual volatile solvents, (be they alcohol, ester, ether or ketone). The oxanilide is compatible with the usual plasticizers such as camphor and its substitutes and its nacreous quality is undisturbed by such associations.

I have used, with very good results, the oxanilide in the same mixtures as ordinarily employed for fish scale or its inorganic substitutes, being careful, of course, to secure substantially complete dispersion in the solvents. As one example of an embodiment of my invention an excellent formula for pearl film to be made by deposition from syrup solution is

| | Parts by weight |
|---|---|
| Pyroxylin | 100 |
| Camphor | 35 |
| Oxanilide | 4–6 |
| Liquid solvent | q. s. |

The oxanilide is added preferably in the form of an essence a typical formula of which is 25% oxanilide scale pearl substance, 10% pyroxylin and 65% butyl acetate or other suitable solvent.

Another excellent formula is as follows:

| | Parts by weight |
|---|---|
| Cellulose acetate | 100 |
| Triphenyl phosphate | 15 |
| Paraethyltoluolsulfonamid | 25 |
| Dibutyl tartrate | 5 |
| Oxanilide | 3–5 |

Owing to its insoluble character, the oxanilide scales may also be dispersed in other organic liquids or solvents for pyroxylin, cellulose acetate, cellulose ester or the like, which may be used for making the artificial pearl essence. Such an essence for example, may be made by the incorporation of 25 parts of oxanilide pearl scale with 100 to 150 parts of a mixture of equal parts of ethyl alcohol, methyl alcohol, and butyl acetate into which are dissolved 10 to 15 parts or more of pyroxylin, acetyl cellulose or other substance. This essence or solution can then be employed for the production of decorative plastic material by any one of a number of methods now practiced by those skilled in the art of using fish scale essence or its substitutes.

The essence of oxanilide and cellulose ester can also be utilized in liquid coating compositions for obtaining pearly effects. Thus it may be employed in dopes and varnishes and also for example in the manufacture of colored pearls by coating beads or the like in a manner well known in the art. In other words, the invention embraces the application of oxanilide not only to solid compositions such as manipulated on rolls, presses, etc., but also their application to liquid compositions such as varnishes, dopes, and the like.

In the production of decorative plastic materials the oxanilide pearl essence may be incorporated in the plastic substance itself while in the course of rolling or converting or in a solution of the same, which is then flowed on a film wheel similar to the manner used in the manufacture of cinematographic film, or a scale bearing mass may be extruded through a die. A suspension of scales can also be applied to the surfaces of sheets of plastic masses. In fact, the novel luster producing material may be used in any of the methods known in the art for producing imitation mother-of-pearl or similar decorative features.

The films or layers containing the scales are then superposed and welded or flowed together in the usual manner by heat and pressure. Sheets of suitable thickness are then cut, polished and mounted on different colored backgrounds to produce various decorated configurations. Different colored effects may also be produced by the use of dyes or coloring matter in the plastic material itself. The proportions employed are from about 2 to 8 parts of oxanilide to 100 parts of pyroxylin or other material. The invention is not limited to these proportions as more or less may be used depending upon the effect to be obtained; but, in general, the above proportions will produce satisfactory results.

Other methods of incorporating compounds of this character in plastic masses will suggest themselves to persons skilled in the art.

While reference has been made to the plastic employed as pyroxylin, it is understood that other materials may be employed in place of pyroxylin, such, for example, as other compounds of cellulose such as acetyl cellulose, cellulose esters and ethers and other materials such as those made with gelatin, casein, formaldehyde condensation products or other synthetic resins.

It is to be noted that the novel fish scale substitute herein set forth may be compatibly mixed with fish scales themselves or with fish scale substitutes including those of the inorganic class. This procedure may be desired in some instances particularly where it is desired to rework scrap containing true fish scale essence or some other fish scale substitute.

The invention is not limited to the use of oxanilide as a fish scale substitute inasmuch as the invention also includes derivatives of oxanilide for this purpose.

I deal herein with oxanilide as a nacreous substance and not as a solid mass. The use is based upon its thorough dispersion in separated particles, and not on a use like that of acetanilide or other anilide isomers of merely plasticizer value.

For the purposes of the claims the term lustrous includes pearly, nacreous, scintillating, silky and/or other similar effects.

It is understood that the foregoing detailed description is merely by way of illustration and that many variations may be made therein within the scope of the claims without departing from the spirit of the invention.

I claim:

1. Composition of matter containing oxanilide and having a lustrous appearance.

2. Composition of matter comprising a pearl-like material containing lustrous particles of oxanilide.

3. Composition of matter possessing thermoplastic properties, containing oxanilide, and having a lustrous appearance.

4. Composition of matter containing a thermoplastic cellulose derivative, and oxanilide, and having a lustrous appearance.

5. Composition of matter containing a thermoplastic cellulose ester, and oxanilide, and having a lustrous appearance.

6. Composition of matter containing cellulose nitrate and oxanilide, and having a lustrous appearance.

7. Composition of matter containing a cellulose ester, a plasticizer therefor and oxanilide, and having a lustrous appearance.

8. Composition of matter comprising a thermoplastic roll product containing approximately 100 parts of a cellulosic plastic 3 to 6 parts of lustrous oxanilide and a plasticizer.

9. Composition of matter comprising a thermoplastic extruded product containing approximately 100 parts of a cellulosic plastic 3 to 6 parts of lustrous oxanilide and a plasticizer.

10. Composition of matter comprising a flowed sheet of plastic material containing approximately 100 parts of a cellulosic plastic 3 to 6 parts of lustrous oxanilide, and a plasticizer.

11. A liquid cellulosic composition comprising approximately 25 parts oxanilide, 10 to 15 parts cellulosic plastic, and 100 to 150 parts of a volatile solvent for the cellulosic plastic.

12. A liquid composition adapted for producing decorative effects comprising oxanilide, a basic substance, and a volatile solvent for said basic substance.

13. A liquid holding in suspension lustrous particles of oxanilide.

In testimony whereof, I have hereunto subscribed my name.

AMERIGO F. CAPRIO.